United States Patent [19]
Wiese

[11] 4,114,900
[45] Sep. 19, 1978

[54] BALANCED MECHANICAL SEAL WITH FLOW CONTROL

[75] Inventor: Winfred John Wiese, Whittier, Calif.

[73] Assignee: Borg-Warner Corporation, Chicago, Ill.

[21] Appl. No.: 834,036

[22] Filed: Sep. 19, 1977

Related U.S. Application Data

[63] Continuation of Ser. No. 615,278, Sep. 22, 1975, abandoned.

[51] Int. Cl.² .......................... F16J 15/34; F16J 15/48
[52] U.S. Cl. .......................................... 277/27; 277/74; 277/93 SD; 277/29
[58] Field of Search ................... 277/3, 27, 74, 93 R, 277/93 SD, 29, 59, 81 R

[56] References Cited

U.S. PATENT DOCUMENTS

| 2,824,759 | 2/1958 | Tracy | 277/93 X |
|---|---|---|---|
| 2,930,636 | 3/1960 | Tracy | 277/93 X |
| 2,984,507 | 5/1961 | Welch | 277/27 |
| 3,042,414 | 7/1962 | Tracy | 277/93 X |
| 3,144,253 | 8/1964 | Schirmer | 277/27 |
| 3,179,422 | 4/1965 | Phillips | 277/3 |
| 3,227,463 | 1/1966 | Wiese | 277/93 |
| 3,318,604 | 5/1967 | Tracy | 277/27 |
| 3,339,930 | 9/1967 | Tracy | 277/27 |
| 3,433,489 | 5/1969 | Wiese | 277/74 |
| 3,804,424 | 4/1974 | Gardner | 277/27 |

Primary Examiner—Robert S. Ward, Jr.
Attorney, Agent, or Firm—Aubrey L. Burgess

[57] ABSTRACT

A balanced mechanical seal structure is disclosed which is constructed to control the leak rate across the seal faces as a function of the pressure differential between the pressure in the stuffing box and the pressure in the seal chamber. The structure is particularly adapted for use in a tandem seal arrangement.

15 Claims, 11 Drawing Figures

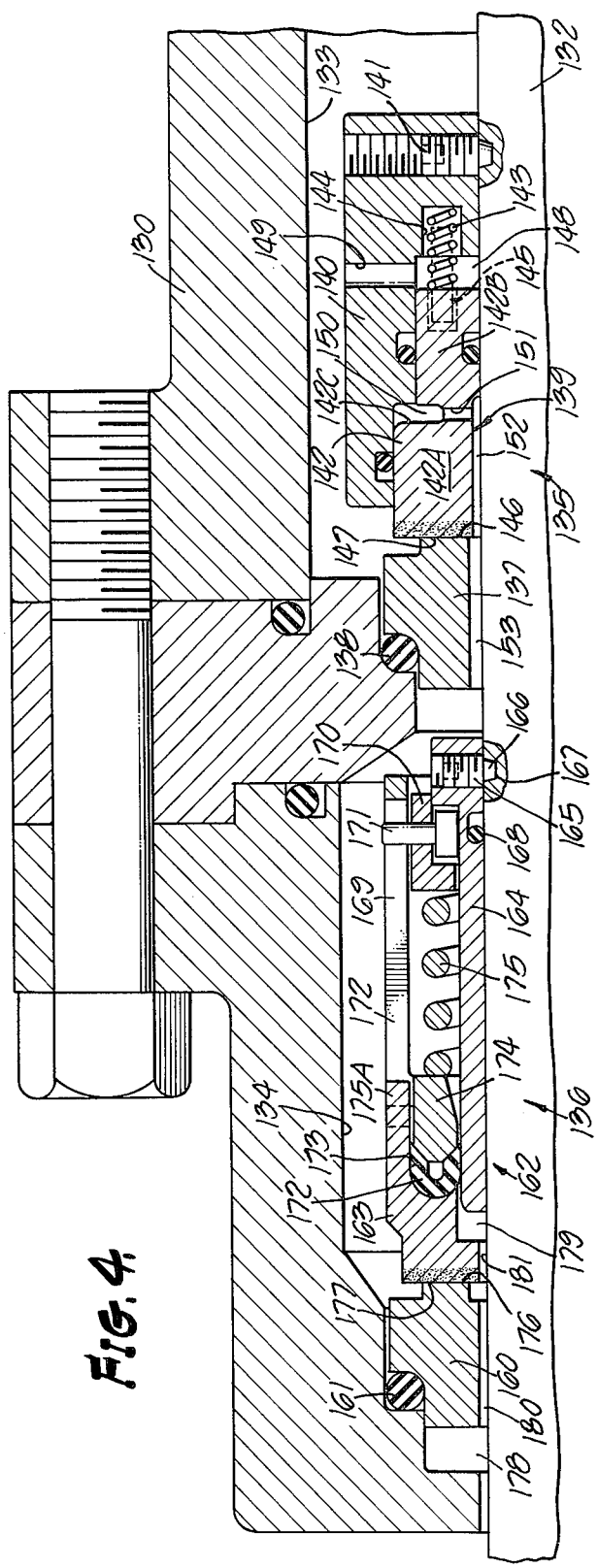
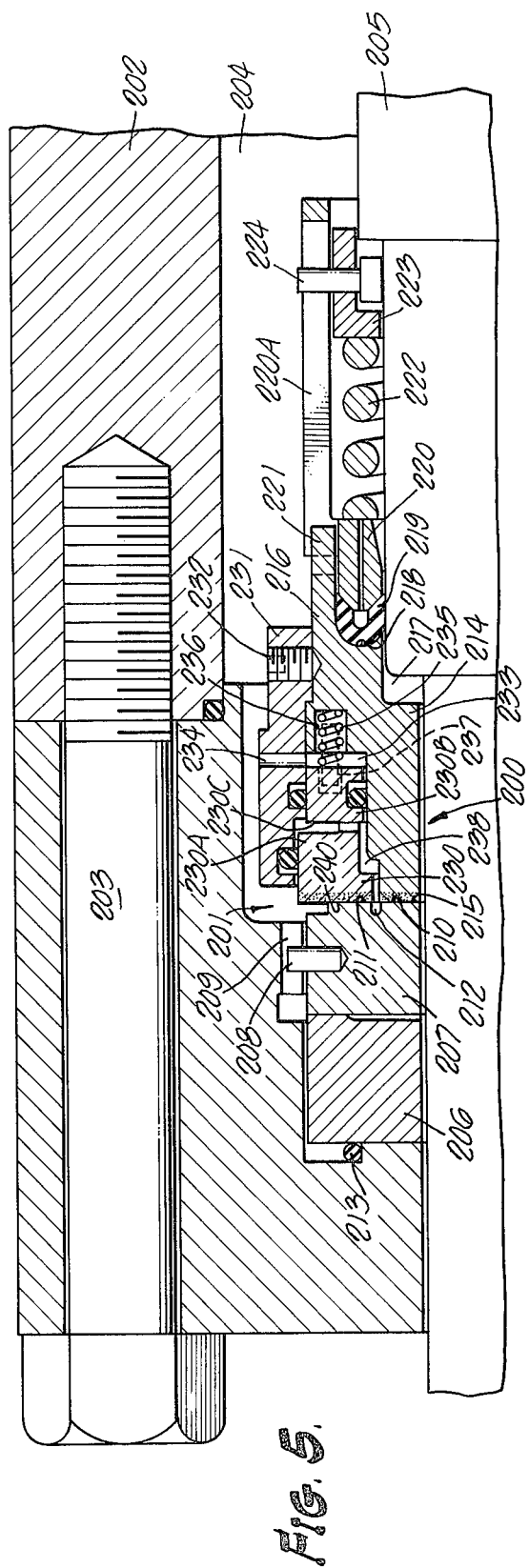

4,114,900

BALANCED MECHANICAL SEAL WITH FLOW CONTROL

REFERENCE TO RELATED APPLICATION

This application is a continuation of application Ser. No. 615,278, filed Sept. 22, 1975, now abandoned.

BACKGROUND OF THE INVENTION

Mechanical seals comprising a rotatable sealing member and a non-rotatable sealing member having contacting sealing faces are well known in the art. Usually, one of the sealing faces is on the non-rotatable sealing member which is capable of little or no axial movement. The other sealing member is rotatable and axially movable with respect to the non-rotatable member. The rotatable sealing member is urged by resilient means and by fluid pressure, usually of the sealed fluid, toward the non-rotatable sealing member to maintain the sealing faces of the two members in sliding sealing engagement.

Where the fluid pressure applied to the back of the rotatable sealing member to urge the latter toward the non-rotatable sealing member is at least partially counteracted by application of said pressure at the front end of the rotatable sealing member tending to urge the rotatable sealing member away from the non-rotatable sealing member, the seal has become known as a balanced seal. In such a balanced seal, the effective area, i.e., the area on which the sealed fluid (which hereinafter may be referred to as stuffing box fluid) acts on the two sealing faces to urge them together, is always smaller than the bearing area, i.e., the contact area between the rotating and stationary or non-rotating sealing faces. Thus, there is a reduced unit load at the sealing faces in a balanced seal.

THE INVENTION

This invention relates to an improved balanced mechanical seal structure which can be used alone or in combination with one or more additional mechanical seals in a tandem or double seal arrangement. In the seal structure according to this invention, the rotatable seal member is constructed with portions of different diameters which may be partially separated by an annular groove. In position within the housing, a chamber is defined which communicates via a radial opening in the seal member with the lower pressure side of the seal. The larger diameter portion of the seal member carries the seal surface, any surface outside of the confines of the seal surface being exposed to the high pressure differential acting on the seal member portion which carries the seal face, this portion is caused to distort and become convex. The degree of convexity of the seal face determines the leak rate through the seal (between the seal faces). Leakage through the seal is well known and desirable, it provides lubrication for the relatively rotating seal faces and also provides a method for cooling the seal faces.

Such a seal can be used as a regulating device to control the pressure in a downstream (lower pressure) seal chamber. As such, the seal device is used in an axial or radial tandem arrangement with one or more additional mechanical seals.

THE DRAWINGS

FIG. 4 is a longitudinal quarter-sectional view of an axial tandem mechanical seal arrangement wherein the higher pressure seal includes a rotary sealing ring arrangement similar to that shown in FIGS. 1 and 2;

FIG. 5 is a longitudinal quarter-sectional view of a radially arranged tandem mechanical seal wherein the outer, or higher pressure, rotary sealing ring embodies the invention;

DETAILED DESCRIPTION

Figure 1:
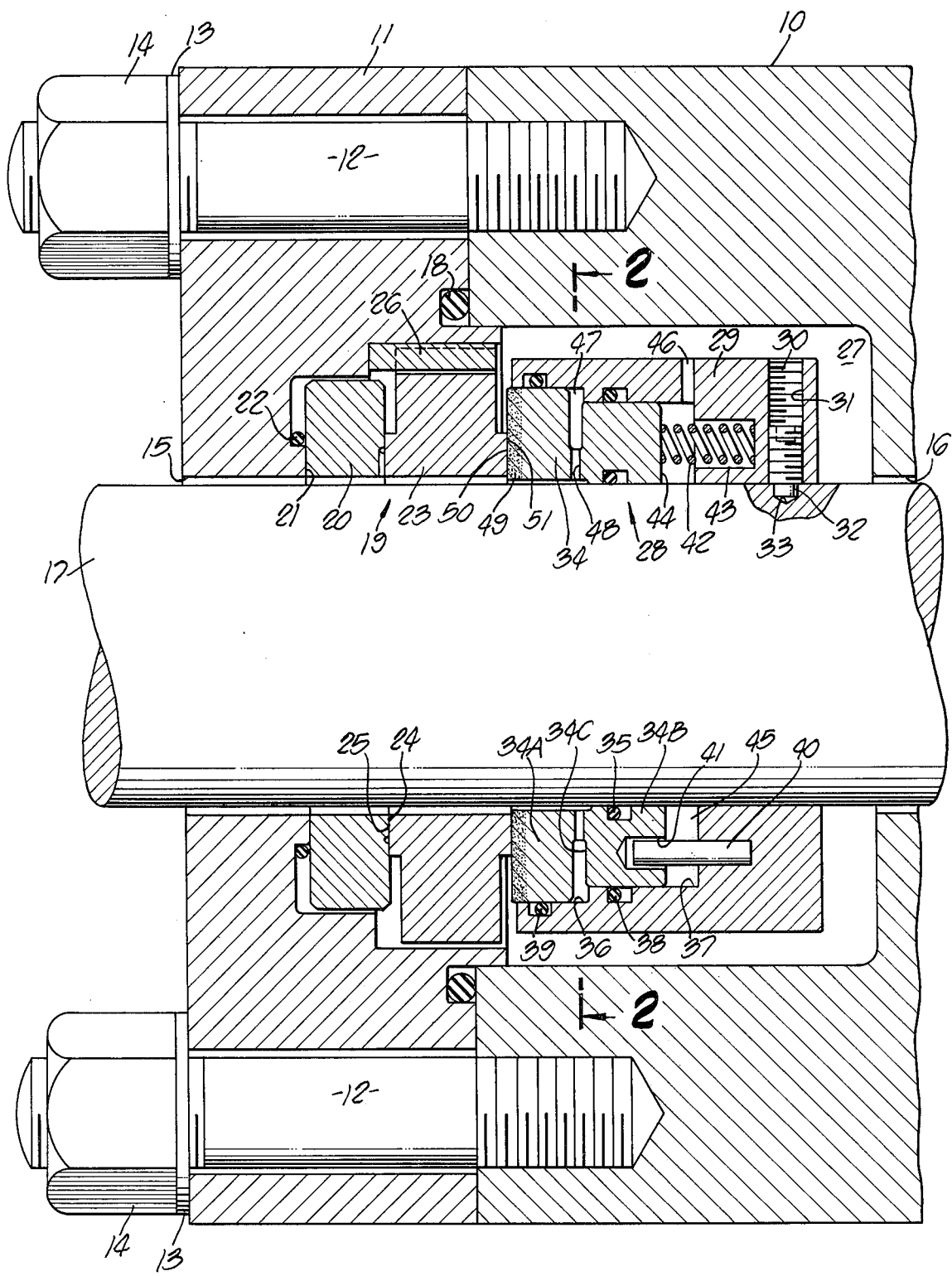
FIG. 1 is a longitudinal sectional view of a single-stage mechanical seal assembly in accordance with the invention, the high pressure side being on the radially outer peripheries of the sealing rings.
Figure 2:
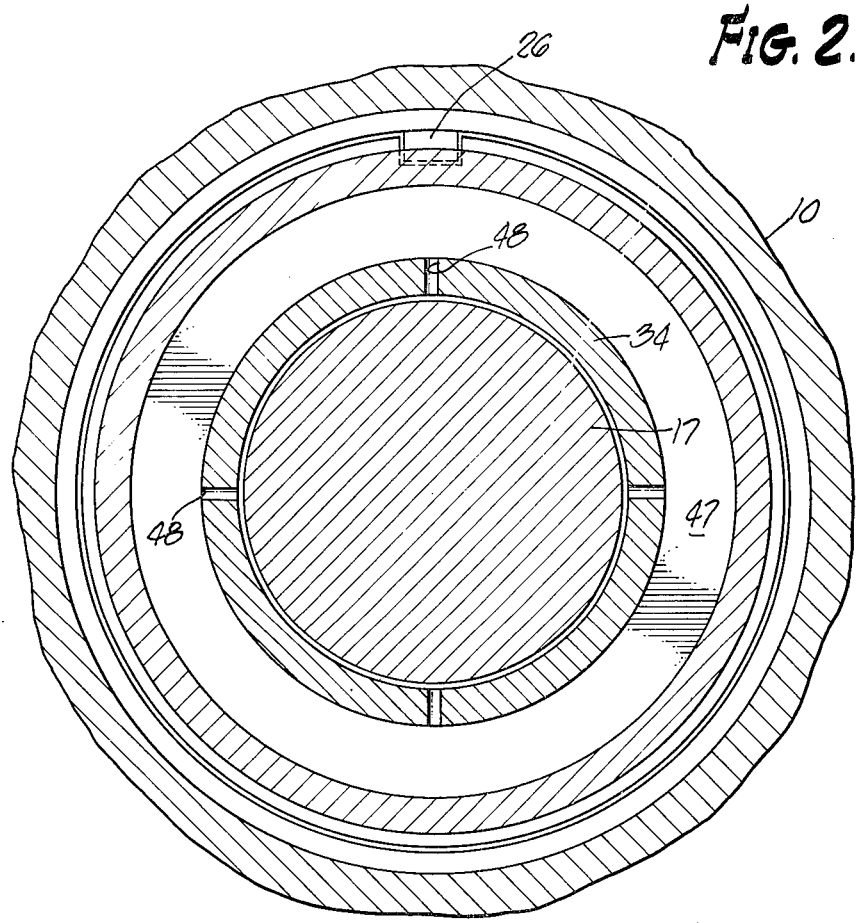
FIG. 2 is a sectional view taken along the line 2—2 of FIG. 1.

One form of the invention is shown in FIGS. 1 and 2 to which attention is invited. The apparatus includes a housing 10 having a flange 11 affixed thereto by a stud 12 having a washer 13 and a nut 14 threaded to the stud. Several such fasteners will be arranged about the circumference of the flange to secure the latter to the housing. The flange 11 has an opening 15 and the housing 10 has a corresponding opening 16. A shaft 17 extends through the openings 15 and 16, and is supported for rotation by suitable bearings (not shown).

The housing 10 may be a pump housing, for example, and the shaft 17 may carry a pump impeller at its inner and right-hand end.

The flange 11 is statically sealed to the housing 10 by an O-ring seal 18.

The flange 11 supports a stationary sealing ring assembly designated by the general reference numeral 19. This stationary sealing ring assembly includes a backup ring 20 supported on an annular shoulder 21 of the flange 11, and sealed to the flange by an O-ring 22. A stationary sealing ring 23 is supported upon a backup ring 20. The backup ring has a lapped face 24 opposed to a lapped face 25 on the stationary sealing ring to provide a liquid-tight joint between the backup ring and the sealing ring. The flange 11 has an attached key 26 to receive a keyway in the sealing ring 23 to prevent the sealing ring 23 from rotating.

The housing 10 provides a stuffing box or chamber 27 to accommodate a rotary sealing ring assembly designated by the general reference numeral 28, the rotary sealing ring assembly being carried by the shaft 17. The rotary sealing ring assembly has a shell-spring holder 29. A set screw 30 threaded into a bore 31 in the shell-spring holder 29 has a dog point 32 projecting into a corresponding hole 33 in the shaft to fix the shell-spring holder to the shaft for rotation with the latter.

A rotary axially movable sealing ring 34 comprising a pair of annular parts 34A and 34B of different outside diameters, which portions are partially defined by an annular groove 34C is fitted on the shaft 17 and is sealed to the shaft by an O-ring 35. The shell-spring holder has a bore 36 and a counterbore 37 accommodating the rotary sealing ring. O-ring 38 seals the rotary sealing ring in the counterbore 37, and another O-ring 39 seals the rotary sealing ring in the bore 36.

The rotary sealing ring 34 is caused to turn with the shaft and the shell-spring holder by a drive pin 40 carried by the shell and extending into a drive pin hole 41 provided in the rotary sealing ring. The rotary sealing ring is urged into engagement with the stationary sealing ring 23 by compression spring 42 seated in a spring pocket 43 in the shell-spring holder and bearing against the rear surface 44 of the rotary sealing ring 34.

Provided between the shell-spring holder 29, the rotary sealing ring 34 and the shaft 17 is an annular fluid pressure chamber 45. The annular fluid pressure chamber 45 is in communication with the stuffing box 27 (the higher pressure side of the structure) through a fluid passageway 46. One or more of these passageways may be arranged circumferentially of the structure. Another annular chamber 47 which is defined by the groove 34C and the bore 36 is provided between the rotary sealing ring 34 and the shell-spring holder 29, the chamber 47 communicating with the atmosphere or the lower pressure side of the structure through one or more radial passageways 48.

The sealing rings 23 and 24 may be made of any suitable materials. For example, the stationary sealing ring 23 may be made of carbon and the rotary sealing ring may be made of stainless steel with a hard facing indicated by the dotted portion 49, the surface of which forms a sealing face 50. The surface of the sealing ring 23 presents a sealing surface 51 engaging the surface 50.

It will be noted that the stuffing box pressure in the stuffing box 27 is higher than atmospheric pressure and that there is a pressure drop across the sealing interface defined by the seal surfaces 50 and 51 from the outer periphery to the inner periphery.

Figure 6:
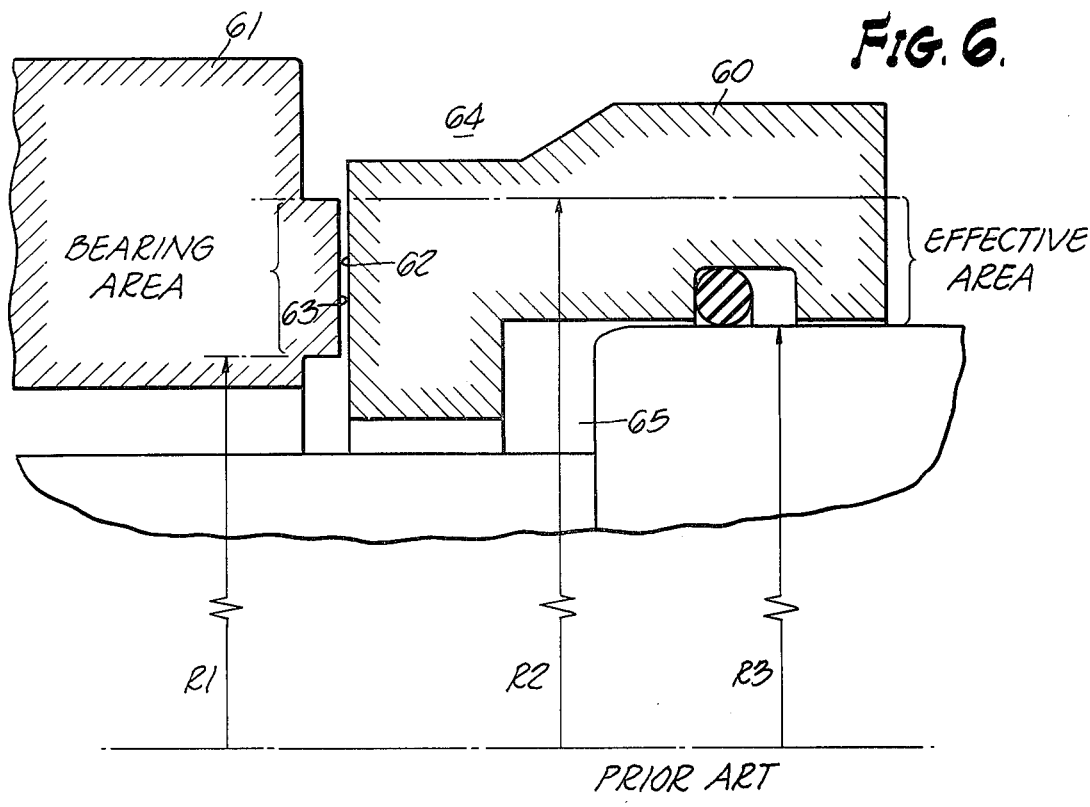
FIG. 6 is an enlarged partial longitudinal quarter-sectional view of a mechanical seal assembly of the prior art.
Figure 8A:
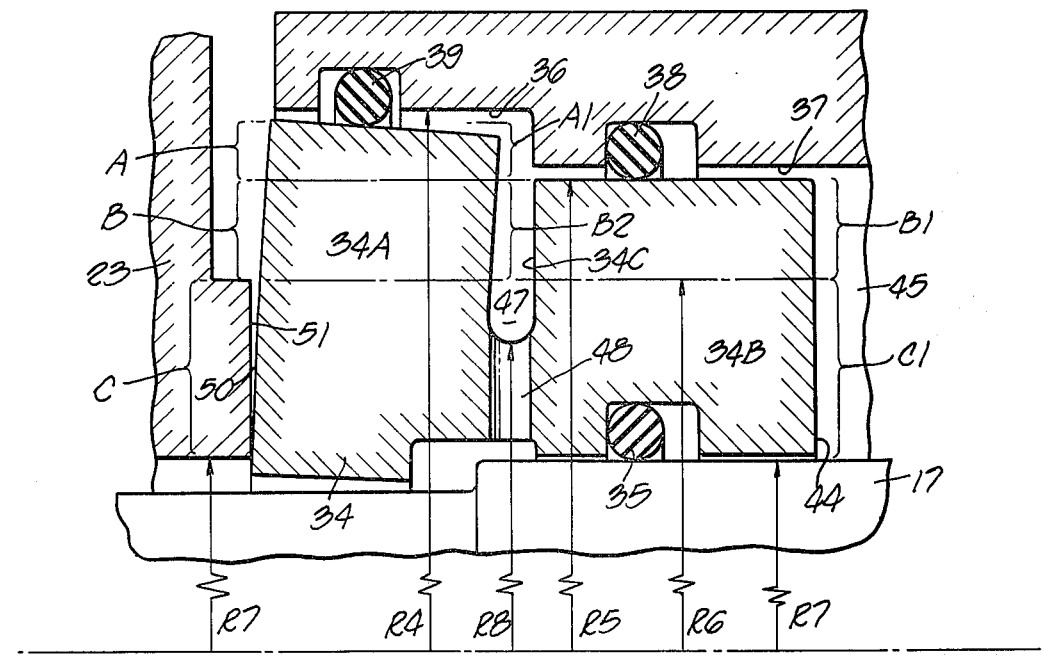
FIGS. 7A and 8A are views similar to FIGS. 7 and 8 but showing a seal in which the areas C and C1 are equal and the shaft is stepped.
Figure 7:
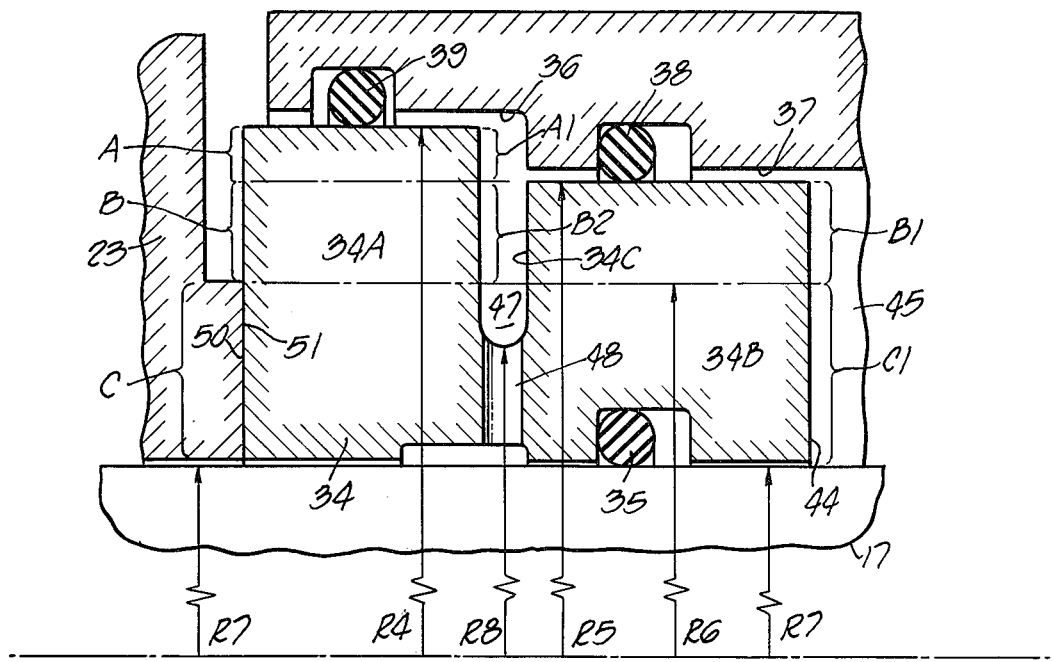
FIG. 7 is a still further enlarged and diagrammatic view of a portion of the mechanical seal assembly shown in FIG. 1.
Figure 8:
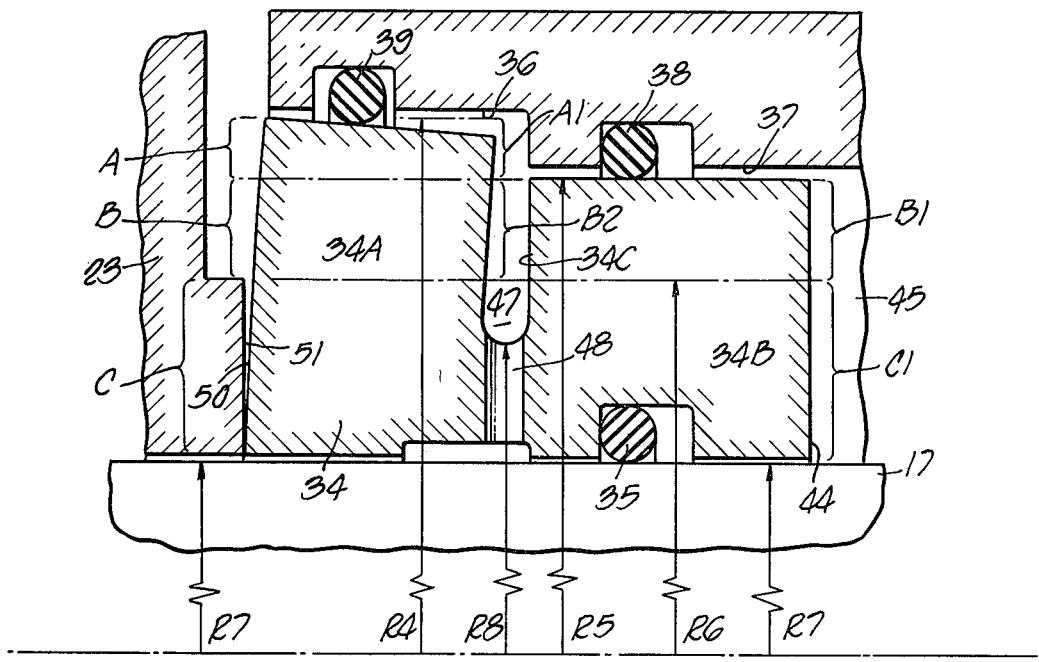
FIG. 8 is a view like FIG. 7 but showing the mechanical seal during operation wherein one of the sealing members is distorted (exaggerated in the Fig.) by the fluid pressure.

An enlargement of a portion of FIG. 1 is shown in FIGS. 7 and 8, wherein corresponding parts are referred to with like reference characters. Reference is also made to FIG. 6, illustrating a typical prior art balanced mechanical seal assembly.

The mode of operation and the principles of the invention will now be described according to FIGS. 7 and 8 with reference to FIG. 6, the prior art structure.

In FIG. 6, which illustrates a prior art mechanical seal structure, the rotary seal member is identified as 60 while the stationary or non-rotating seal member is identified as 61. The member 60 has a seal face 62 while the member 61 has an engaging seal face 63.

The cavity identified as 64 is subjected to stuffing box or high pressure fluid while the cavity 65 is subjected to a lower pressure. To achieve the desired seal performance, the unit load at the seal faces is lower than the unit load in the stuffing box. The reduction of the unit load at the seal faces is accomplished by a ratio of two areas, i.e., the bearing area (the area of the face 62 and define by the difference of R1 and R2) versus the effective area, (the area at the rear of the member 60 defined by the difference of R2 and R3). The bearing area can also be defined as the contact area between the rotating and stationary faces 62 and 63, respectively. The effective area is the area on which the stuffing box pressure acts to hold the two seal faces in contact with one another. In a balanced seal, the effective area is always smaller than the bearing area causing a reduced unit load at the seal faces.

Referring now to FIGS. 7 and 8 which differ only that FIG. 8 shows the seal during operation in exaggerated configuration and where like reference characters are used to identify like parts, there are seven areas, identified as A, A1, B, B1, B2, C and C1. The areas A and A1 (on opposite sides of 34A) are the areas between the radii R4 and R5 and are equal. The areas B, B1 and B2 are also equal and are the areas between the radii R5 and R6. The areas C and C1 are the areas between the radii R6 and R7.

The stuffing box pressure in the chamber 45 acts on areas B1 and C1 at the rear surface 44 of the rotary seal ring 34. At the other end of the rotary seal ring 34, the stuffing box pressure acts on areas A and B radially outside the contact surfaces 50 and 51. Because areas B and B1 are equal with equal pressure acting in opposition, these two forces cancel one another with respect to axial movement of the rotary seal ring 34. The stuffing box pressure acting on area A with atmospheric pressure (or a pressure lower than the stuffing box pressure but for descriptive purposes referred to as atmospheric pressure) acting on area A1 results in a positive force acting to the right (as viewed in the drawing) on the rotary seal ring 34. The atmospheric pressure acting on area A1 in chamber 47 is maintained by the radial passageways 48 which communicate with the lower pressure side of the mechanical seal assembly.

For the seal of this invention, the effective area is equal to the difference in area between areas C1 and area A. The bearing area is equal to area C. The stuffing box pressure acts on areas A and C1. The balance or unit load is equal to the ratio of areas $(C1-A)/C$.

If, for example, a 0.75 balance ratio in the seal is desired, with C equal to unity, A must be equal to 0.25; with this combination of areas, the unit load at contact surfaces 50 and 51 will equal 0.75 of stuffing box pressure.

Referring now to FIG. 8, the left hand portion 34A of the rotary seal ring 34 is shown tilting or distorted to present a convex configuration at the seal face 50. The degree of convexity can be controlled by areas A and B and the depth of the groove 34C or the radius R8 which defines the groove. The amount of convexity of the seal face 50 determines the leak rate through the seal. Leakage of fluid across the seal faces is desirable to provide lubrication for the relatively rotating parts and also to cool the seal faces. If the convexity of the seal face 50 is large, the leak rate will also be large because stuffing box pressure can penetrate deeper between the seal faces 50 and 51. Conversely, if the convexity is small, the leak rate will be small. In actual usage, the convexity of the seal face 50 is very minute, being on the order of a few millionths of an inch.

These features make it possible to design a seal with a desired leak rate, i.e., by selecting the depth of the groove 34C, and the areas A, B, C and C1.

Figure 1A:
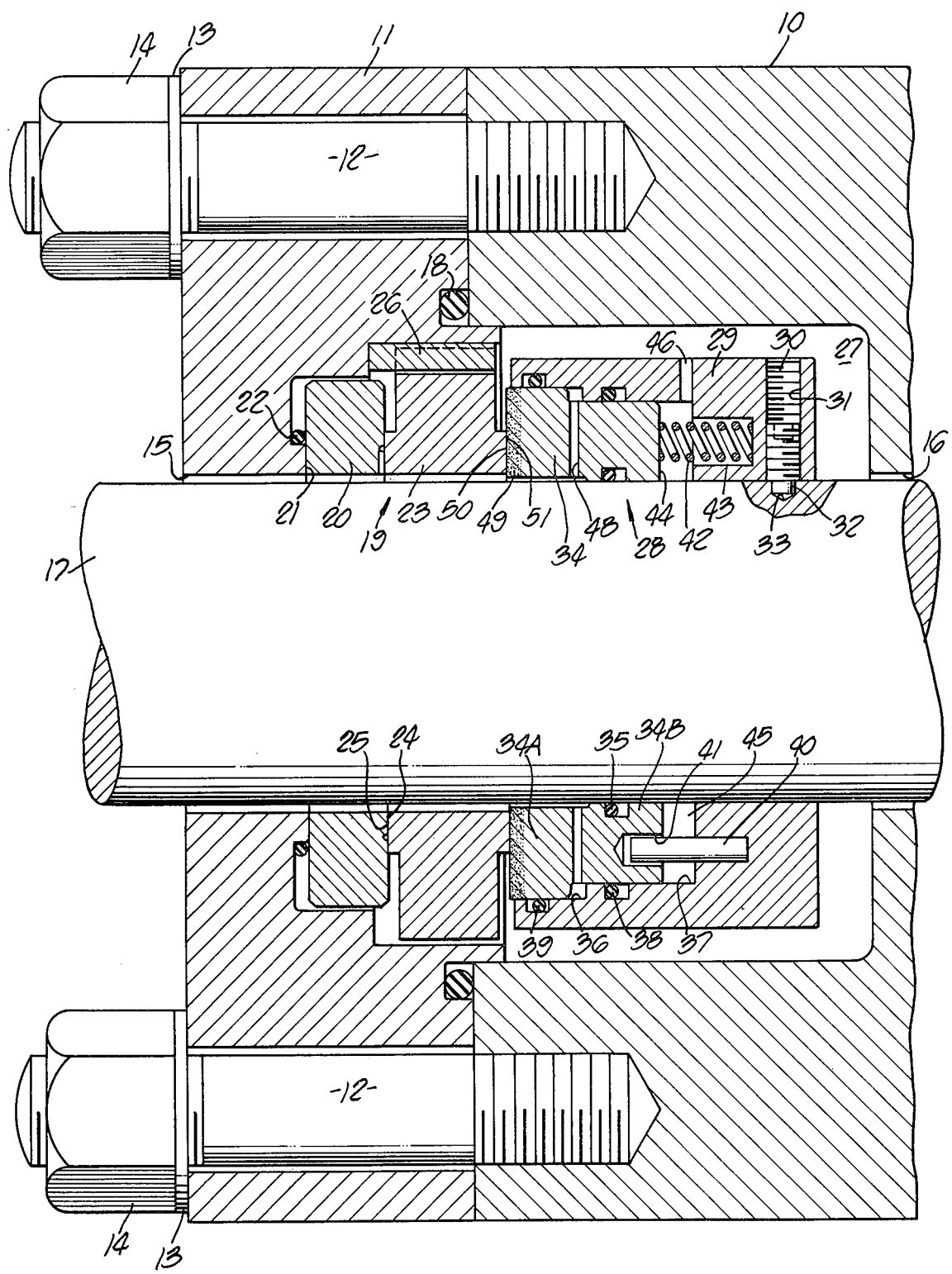
FIG. 1A is a view similar to FIG. 1 showing a slightly different modification of the mechanical seal assembly.
Figure 7A:
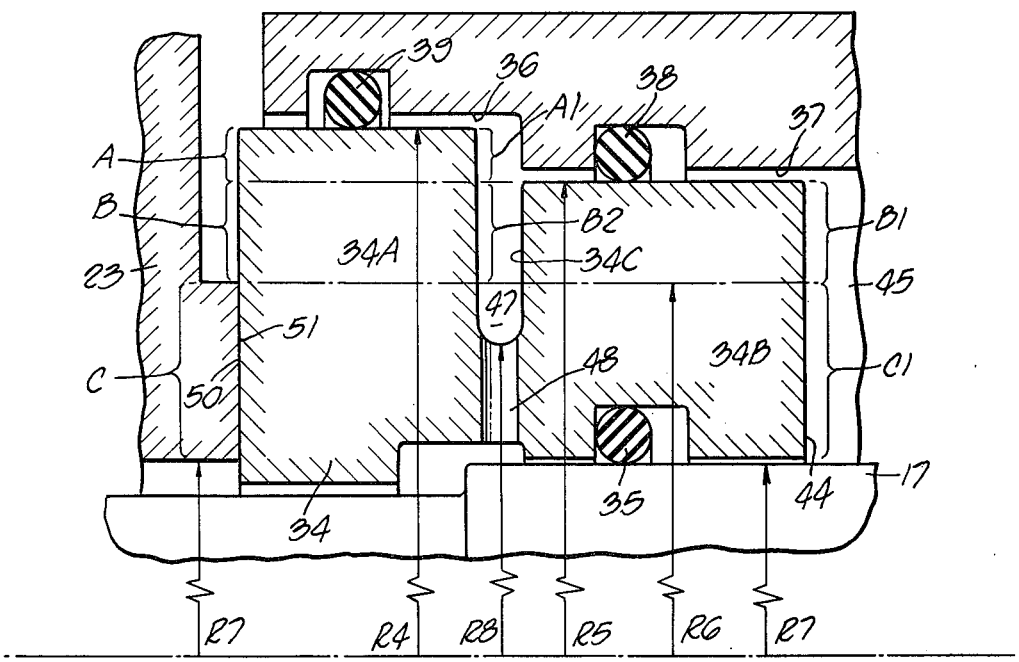

FIGS. 7A and 8A are essentially the same as FIGS. 7 and 8 but using a stepped shaft 17 in which the areas C and C1 are equal. FIG. 1A is a slightly modified form of FIG. 1 in which the same reference characters are used; it differs from FIG. 1 in the absence of a groove 47; the sealing ring 34 does, however, have portions of different diameters.

Figure 3:
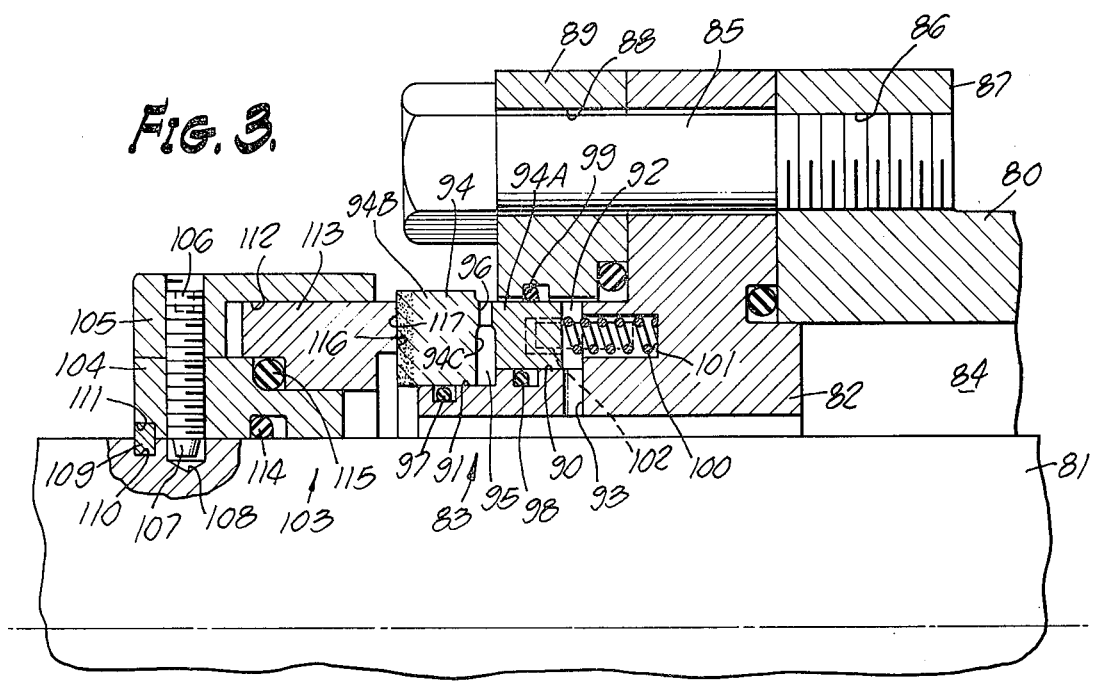
FIG. 3 is a quarter-sectional view of another form of a single-stage mechanical seal assembly wherein the higher fluid pressure exists radially inwardly of the sealing rings.

FIG. 3 illustrates a modified mechanical seal arrangement in which the higher fluid pressure exists radially inwardly of the seal rings. There is shown a cylindrical housing 80 surrounding a shaft 81 and defining, with an annular spring holder 82 of stationary seal ring assembly 83, a chamber or stuffing box 84.

The spring holder 82 is connected to the housing 80 by machine bolts 85 which are threadably received in threaded bores 86 in a flange 87 of the housing 80 and which pass through bores 88 in a clamping ring 89. Suitable O-ring seals are provided to seal the parts 80, 82 and 89 together. The spring holder 82 is formed with a first reduced diameter portion 90 and a second reduced diameter portion 91. The portion 90 and the clamping ring 89 define a cavity 92 which communicates with the stuffing box 84 by one or more radial passages 93 drilled in the retainer 82 and through to the inner part of the retainer 82.

The seal assembly 83 also comprises an axially movable seal ring 94 having an annular portion 94A received in the cavity 92 and a larger annular portion 94B, the interior of which engages the reduced diameter portion 91 of the spring holder. The seal ring 94 is provided with an annular groove 94C to define a cavity 95. The cavity 95 communicates with the low pressure side of the seal (which may be atmospheric pressure) by one or more radial passages 96. O-ring seals 97, 98 and 99 seal the seal ring 94 with the spring holder 82 and the clamping ring 89. Coil springs 100 received in pockets 101 in the spring holder 82 urge the seal ring 94 to the left, as viewed in the drawing. Suitable drive pins 102 couple the seal ring 94 to the spring holder 82 and thus to the housing 80, insuring non-rotation of the seal ring.

Also provided in the assembly is a rotary seal ring assembly, generally identified as 103. The assembly 103 comprises a pair of annular rings 104 and 105 which are connected to the shaft 81 by a set screw 106 having a dog point 107 received in a hole 108 in the shaft 81. A snap ring 109 fitting in a groove 110 in the shaft 81 and in a recess 111 in the ring 104 prevents axial movement of the assembly. The rings 104 and 105 define an axially open-ended cavity 112 which receives the rotary seal ring 113. O-ring seals 114 and 115 are provided to seal the ring 104 to the shaft 81 and the seal ring 113 in the cavity 112, respectively. The seal ring 113 has a seal face 116 which contacts the seal face 117 of the seal ring 94. The seal face 117 may be of the same materials as the seal face 50 in the FIG. 1 embodiment.

The FIG. 3 embodiment functions the same as the FIG. 1 embodiment, except that the flow of high pressure fluid or stuffing box pressure to low pressure fluid occurs radially outwardly across the seal faces instead of radially inwardly thereacross.

The seal device of this invention finds particular use as a regulating device to control the pressure in a seal chamber at a much lower pressure than the stuffing box pressure and, as such, is particularly suitable for use in a tandem seal arrangement. Such tandem arrangements are illustrated in FIGS. 4 and 5 wherein a seal arrangement according to this invention is combined with mechanical seal arrangements of more conventional construction. FIG. 4 illustrates an axial tandem arrangement while FIG. 5 illustrates a radial tandem arrangement.

Looking at FIG. 4, there is shown a multiple-part housing 130 comprising suitably joined housing parts connected by a bolt, which housing surrounds a shaft 132. The housing is constructed to provide spaced cavities 133 and 134, the cavity 133 being exposed to stuffing box fluid pressure and the cavity 134 being exposed to a fluid pressure intermediate atmospheric pressure and the stuffing box pressure. One end of the housing (at the left as viewed in the drawing) is exposed to the lowest fluid pressure, i.e., for example, atmospheric. The housing parts are sealed together by suitable O-ring seals.

A mechanical seal arrangement 135 constructed in accordance with this invention is positioned in the cavity 133 and a mechanical seal arrangement 136 of more conventional construction is positioned downstream (i.e., from higher to lower pressure) in the cavity 134.

The mechanical seal assembly 135 comprises a non-rotating or stationary seal member 137 sealed at its periphery to the housing by an O-ring seal 138 and a rotary seal ring assembly 139. The rotary seal ring assembly comprises a shell-spring holder 140 constructed in the same manner as the spring holder 29 in the FIG. 1 embodiment. The spring holder is connected to the shaft 132 by a set screw 141 and receives an axially movable rotary seal ring 142. The seal ring 142 is urged toward the stationary seal ring 137 by a plurality of circumferentially spaced coil spring 143 which engage the back surface of the ring 142 and are received in bores or spring pockets 144 in the spring holder 140. Drive pins 145 insure rotation of the seal ring 142 with the spring holder 140 and the shaft 132. Suitable O-ring seals seal the seal ring 142 to the spring holder 140 and the shaft 132, respectively. The seal rings 137 and 142 may be made of any suitable materials. For examle, the stationary seal ring 137 may be made of carbon and the rotary seal ring may be made of stainless steel with a hard facing indicated by the dotted portion on te face thereof and, as such, the rings have engaging sealing faces 146 and 147, respectively.

Provided between the spring holder 140 and the rotary seal ring 142 is an annular fluid pressure chamber 148 communicating with the stuffing box cavity 133 by one or more radial passages 149.

The rotary seal ring is constructed to have portions 142A and 142B of different diameters, partially separated by a radial groove 142C defining an annular fluid pressure chamber 150 which communicates with the lower pressure cavity 134 by one or more radial passages 151 and axial passages 152 and 153 associated respectively with the seal rings 142 and 137.

The seal assembly 136 comprises a balanced mechanical seal arrangement having a stationary seal ring 160 sealed to the housing 130 by an 0-ring seal 161 and a rotary seal ring assembly 162. The assembly 162 comprises a seal ring 163 suitably attached to the shaft 132 for rotation therewith. The attaching means for the seal ring 163 comprises a sleeve 164 surrounding the shaft 132 and fixed for rotation therewith by a set screw 165 having a dog point 166 fitting into an opening 167 in the shaft 132. An 0-ring 168 seals the sleeve 164 to the shaft 132. A cup-like spring holder 169 is fixed for rotation with the sleeve 164 and the shaft 132 by a collar 170 and the drive pins 171, the drive pins extending into axial slots 172 in the holder 169.

A U-cup packing 172 is positioned in a seat 173 in the seal ring 163 and contacts the sleeve 164; the packing is pressed into seating contact with the seat 173 and the sleeve 164 by a wedge-like expander 174. A coil spring 175 surrounding the sleeve 164 is positioned between the expander 174 and the collar 170 and urges the expander 174 toward the packing 172. Tangs 175A on the seal ring 163 engage slots 172 to drivingly connect the seal ring 163 and the sleeve 164.

The sealing rings 160 and 163 have engaging seal faces 176 and 177, respectively and may be made of any suitable materials. For example, the stationary seal ring 160 may be made of carbon and the rotary seal ring 163 may be made of stainless steel with a hard facing. The rear of the sealing ring 160 is exposed to the lowest fluid pressure in the system, which may be atmospheric pressure. For the purpose, there is provided a cavity 178 behind the sealing ring 160 and, there is a cavity 179 between the terminal end of the sleeve 164 and a portion of the rear of the seal ring 163. The cavities communicate by axial passages 180 and 181 in the rings 160 and 163, respectively.

The seal assembly 135 operates in the same manner as that described with reference to the FIGS. 1 and 2 embodiment. As such, the fluid pressure in the cavity 134 is intermediate that in the stuffing box 133 and that in the cavity 178.

In the FIG. 4 embodiment, an axial tandem seal arrangement, if the seal assembly 136 leaks more than the seal assembly 135, the fluid pressure surrounding the seal 136 in chamber 134 will decrease, also decreasing the fluid pressure in the chamber 150 (which is the same as in the chamber 134) with the pressure in the stuffing box 133 being substantially constant, and the differential pressure between the chamber 150 and the stuffing box pressure will increase. This will increase the convexity of the face 147 on the portion 142A of the rotary seal ring 142, thus increasing the leak rate through the seal 135.

Conversely, if the seal 135 leaks more than the seal 136, the pressure surrounding the seal 136 in the cavity 150 will increase. This decreases the pressure differential between that in cavity 150 and the stuffing box pressure in cavity 133. The convexity of the face 147 of the rotary seal ring portion 142A decreases, thus decreasing leakage through the seal 135.

This seal arrangement can maintain an even split of the main pressure between the two seals 135 and 136, so that each is operating at about ½ the main or stuffing box pressure.

FIG. 5 illustrates another embodiment of this invention in which there is a seal assembly of radially positioned tandem mechanical seals 200 and 201, the seal 201 being constructed in a manner similar to the seal illustrated in FIGS. 1 and 2. The arrangement comprises a multiple part housing 202, the parts of which are one or more joined by bolts 203. The housing has an opening defining a chamber 204 communicating with the stuffing box and subjected to stuffing box pressure. A stepped shaft 205 passes through the housing 202 and through the chamber 204. The seals 200 and 201 share a stationary seal ring assembly which comprises a back-up ring 206 and a seal ring 207 fixed to the housing by one or more drive pins 208 fitted into the ring 207 each of which extends into a slot 209 in the housing part 202. The seal ring 207 is provided with a pair of annular seal surfaces 210 and 211 separated by an annular groove 212. The back-up ring 206 is sealed to the housing by an O-ring 213.

The seal assembly 200 (which is the radially inwardly positioned seal assembly) comprises, in addition to a portion of the stationary seal assembly and the seal face 210, a rotary seal ring 214 having a seal face 215 engaging the seal face 210 and a rearwardly extending tubular portion 216 defining a cavity 217 with the shaft 205, the portion 216 having an annular seat 218 receiving a U-cup packing 219 which is urged into sealing engagement with the seat 218 and the shaft 205 by a wedge shaped expander 220. The expander 220 is part of a tubular spring holder member 220A having a plurality of slots into which tangs 221 of the tubular member 216 extend. The expander 220 is urged toward the packing 219 by a coil spring 222 surrounding the shaft 205 and between the expander and a collar 223. Drive pins 224 couple the collar and the tubular member 221 and thus couple the seal ring 214 to the shaft for concurrent rotation.

The radially outwardly positioned seal assembly 201 comprises an axially movable rotary seal ring 230 surrounding the ring 214 having two portions 230A and 230B partially defined by a cavity 230C. The seal ring 230 is sealed by O-rings to a cylindrical housing 231 which in turn is fixed by one or more threaded set screws 232 to the portion 216 of the seal ring 214.

The seal ring portion 230B is sealed to the seal ring 214 by an O-ring seal. A cavity 233 behind the portion 230B is exposed to stuffing box pressure by means of one or more radial passages 234. A plurality of coil springs 235 fitting into spring pockets 236 in the member 214 urge the seal ring 230 toward the seal ring 207. Suitable drive pins 237 couple the seal ring 230 to the seal rings 214 for concurrent rotation with the shaft.

The cavity 230C which partially separates the seal ring portions 230A and 230B is exposed to an intermediate pressure by a passage 238 communicating with the annular groove 212 in which the intermediate pressure also exists. The portion 230A of the seal ring 230 has a seal face 240 engaging the face 211 on the seal ring 207. As in the previous embodiments, the seal rings may be made of any suitable material, for example, one of carbon and one of stainless steel with a hard facing.

The operation of the radial tandem seal arrangement illustrated in FIG. 5 is substantially the same as the axial tandem seal arrangement illustrated in FIG. 4, and thus requires no further explanation, except to say that the lowest pressure exists in the cavity 217 and in the annular space between the shaft and the components 206, 207 and 214 of the combination.

I claim:

1. A balanced mechanical seal assembly comprising: a housing having a shaft opening;
said housing being exposed at one location to a relatively high fluid pressure and at another location to a fluid pressure less than said relatively high fluid pressure;
a shaft rotatable in said opening;
relatively rotatable mechanical seal means for sealing said opening comprising a first annular seal ring connected to said housing and a second annular seal ring connected to said shaft; one of said seal rings being longitudinally movable;
said annular seal rings having transverse engaging seal faces, the area of one of said faces being greater than that of the other of said faces such that the area free of engagement with the other face is exposed to said location of relatively high fluid pressure;
said seal ring having said greater area seal face being longitudinally movable and having another transverse surface longitudinally spaced from its seal face, said another surface being opposed to and having an area smaller than the area of said one of said faces and being exposed to said location of relatively high fluid pressure, said another surface having an effective area smaller than the bearing area between said engaging seal faces, and the outer diameter of said area free of engagement being greater than the outer diameter of said another transverse surface;

said seal ring having said greater area seal face having yet another transverse surface disposed intermediate its seal face and said another transverse surface and opposed to said area free of engagement, and means communicating said yet another surface with a zone of fluid pressure less than said relatively high fluid pressure;

whereby the pressure differential of the fluid pressures on said yet another surface and on said area free of engagement displaces said yet another surface and said area free of engagement in a direction away from said other of said faces.

2. A mechanical seal assembly as recited in claim 1, wherein said area free of engagement with said other seal face is spaced radially outwardly of the engaging seal faces.

3. A mechanical seal assembly as recited in claim 1, wherein said longitudinally movable annular seal ring comprises annular portions of different diameters at least partially defined by an intermediate annular groove, said groove defining in part said yet another surface.

4. A mechanical seal assembly as recited in claim 1, including spring means urging said seal ring having said greater area seal face towards the other of said seal rings.

5. A mechanical seal assembly as recited in claim 1, wherein said seal ring having said greater area seal face is connected to said shaft, and said other seal ring is connected to said housing.

6. A mechanical seal assembly as recited in claim 1, wherein the engaging area of one of said seal faces comprises a bearing area and an area of the other of said seal faces free of engagement with the other face comprises an effective area and wherein said effective area is about 75% of said bearing area.

7. A mechanical seal assembly as recited in claim 1, and a second mechanical seal assembly in tandem therewith.

8. A tandem mechanical seal assembly as recited in claim 7, wherein said second mechanical seal assembly is axially positioned with respect to the first named seal assembly.

9. A tandem seal assembly as recited in claim 7, wherein said second mechanical seal assembly is radially positioned with respect to the first named seal assembly.

10. A balanced mechanical seal assembly comprising:
a housing having a shaft opening;
said housing being exposed at one location to a relatively high fluid pressure and at another location to a fluid pressure less than said relatively high fluid pressure;
a shaft rotatable in said opening;
relatively rotatably mechanical seal means for sealing said opening comprising a first annular seal ring connected to said housing and a second annular seal ring connected to said shaft;
one of said seal rings being longitudinally movable with respect to the other;
said annular seal rings having transverse engaging seal faces, the area of one of said faces being greater than that of the other of said faces such that the area free of engagement with the other face is exposed to said location of said relatively high fluid pressure;
said seal ring having said greater area seal face having another transverse surface longitudinally spaced from its seal face and axial portions of different diameters defined in part by an annular groove to thus provide yet another transverse surface intermediate its seal face and its another surface, said another surface having an effective area smaller than the bearing area between said engaging seal faces, and the outer diameter of said area free of engagement being greater than the outer diameter of said another transverse surface;
means to expose said groove and said yet another transverse surface with said location of said fluid pressure less than said relatively high pressure; and
means to expose said area of said seal face free of engagement with the other seal face and said another transverse surface with said location of said relatively high fluid pressure;
whereby the pressure differential on said yet another surface and said area free of engagement displaces said yet another surface and said area free of engagement in a direction away from said other of said faces.

11. A mechanical seal assembly as recited in claim 10, wherein said area free of engagement with the other seal face is spaced radially outwardly of the engaging seal faces.

12. A mechanical seal assembly as recited in claim 10, and a second mechanical seal assembly in tandem therewith.

13. A tandem mechanical seal assembly as recited in claim 12, wherein said second mechanical seal assembly is axially positioned with respect to the first named seal assembly.

14. A tandem mechanical seal assembly as recited in claim 12, wherein said second mechanical seal assembly is radially positioned with respect to the first named seal assembly.

15. A mechanical seal assembly as defined in claim 10, wherein the engaging area of one of said seal faces comprises a bearing area and an area of the other of said seal faces free of engagement with the other face comprises an effective area and wherein said effective area is about 75% of said bearing area.

* * * * *